United States Patent [19]

Lohrberg et al.

[11] 4,294,815

[45] Oct. 13, 1981

[54] PROCESS OF PRODUCING CHLORINE DIOXIDE AND, IF DESIRED, CHLORINE

[75] Inventors: Karl Lohrberg, Heusenstamm; Siegfried Bielz, Frankfurt am Main; Paul Janisch, Steinau, all of Fed. Rep. of Germany

[73] Assignee: Metallgesellschaft Aktiengesellschaft, Frankfurt, Fed. Rep. of Germany

[21] Appl. No.: 93,708

[22] Filed: Nov. 13, 1979

[30] Foreign Application Priority Data

Nov. 14, 1978 [DE] Fed. Rep. of Germany ....... 2849250

[51] Int. Cl.³ .............................................. C01B 11/02
[52] U.S. Cl. ..................................... 423/478; 204/95; 204/98; 204/128
[58] Field of Search .................... 423/478; 204/95, 98, 204/128

[56] References Cited

U.S. PATENT DOCUMENTS

| | | | |
|---|---|---|---|
| 3,442,778 | 5/1969 | Westerlund | 423/478 |
| 4,069,117 | 1/1978 | Cooper | 204/128 |
| 4,075,308 | 2/1978 | Rapson | 423/478 |
| 4,169,773 | 10/1979 | Lai | 204/98 |

*Primary Examiner*—Brian E. Hearn
*Attorney, Agent, or Firm*—Sprung, Felfe, Horn, Lynch & Kramer

[57] ABSTRACT

A process for the production of chlorine dioxide by membrane electrolysis of aqueous sodium chloride, reaction of hydrogen and chlorine so-formed to form hydrogen chloride and reaction of the so-formed hydrogen chloride with the sodium chlorate also formed by the electrolysis to form chlorine dioxide is disclosed. Also disclosed is the production of chlorine by such a process.

13 Claims, 1 Drawing Figure

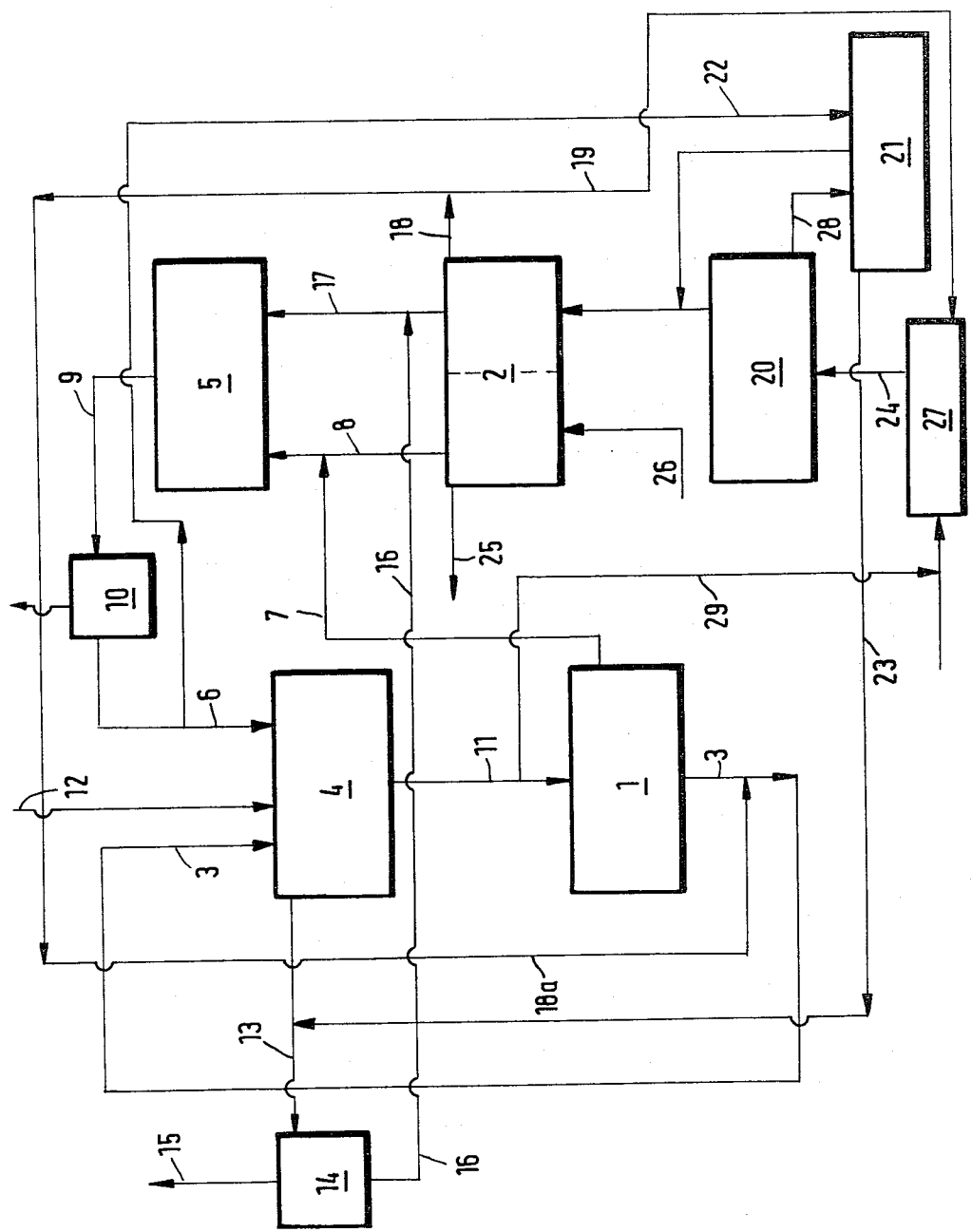

PROCESS OF PRODUCING CHLORINE DIOXIDE AND, IF DESIRED, CHLORINE

BACKGROUND OF THE INVENTION

1. Field of the Invention

This invention relates to a process of producing chlorine dioxide and, if desired, chlorine from hydrogen chloride and electrolytically produced alkali chlorate wherein the resulting residual solution is recycled to the electrolytic process by which new chlorate is produced.

2. Discussion of the Prior Art

It is known to use chlorine, chlorine dioxide and sodium hydroxide solution for bleaching pulp in pulp mills. Whereas chlorine and sodium hydroxide solution are commercially available, chlorine dioxide must be produced where it is used because it is explosive when concentrated. For this reason, it is known to produce chlorine dioxide by reduction of commercially available chlorate in a solution of a mineral acid which, in pulp mills, usually consists of sulfuric acid. In sulfate pulp mills, the resulting sodium sulfate has been used to make up for sodium sulfate which has been lost. Increased efforts to decrease the consumption of sulfates have been made for ecological reasons. As a result, it is no longer possible to use, in the pulp mill, all sulfate which becomes available in the production of chlorine dioxide. On the other hand, more and more stringent requirements are being imposed as regards the quality of pulp and this necessitates a higher consumption of chlorine dioxide, which is essential for a production of high-strength fibers and for a high brightness. For these reasons, conventional processes of producing chlorine dioxide result in increasing quantities of surplus sodium sulfate.

In the so-called Munich process of producing chlorine dioxide which is known from German Patent No. 831,542, chlorate is reacted with acid in a quantity which is not in excess of that which is stoichiometrically required, and the residual solution, which contains sodium chlorate, is recycled to the electrolytic process for producing chlorate. In said Munich process, a continuous stream of a sodium chlorate solution which contains sodium chloride flows at elevated temperature through a plurality of successive reaction vessels, preferably through six of such vessels, and is reacted therein with hydrochloric acid. The resulting mixed gases consisting of chlorine dioxide and chlorine are diluted with an air stream and are sucked off to ensure that the chlorine dioxide content in the reactor gas remains below the exposition limit of 15 percent. When the reaction solution has been concentrated by evaporation, it contains sodium chlorate and a large quantity of sodium chloride and is then fed to the electrolytic process for producing chlorate. The resulting chlorate solution is returned to the cycle. When chlorine dioxide from the mixture of chlorine dioxide, chlorine and air leaving the chlorine dioxide reactor has been absorbed, hydrochloric acid can be produced in that the chlorine contained in said mixture can be burnt with the hydrogen which has been produced in the chlorate-producing electrolytic process. Obviously, the quantity of hydrochloric acid which is thus produced is less than is required for the production of all chlorine dioxide.

The process which has been described involves another difficulty, in that the dilution with air must be very closely controlled in order to enable a combustion of chlorine with atmospheric oxygen. On the other hand, a supply of air at a lower rate would involve a rather close approach to the explosion limit of chlorine dioxide.

A further disadvantage of that process resides in that hydrochloric acid is not available or is in short supply in non-industrialized countries and a transportation of hydrochloric acid is expensive because hydrochloric acid is commercially available usually only as a 32 percent aqueous solution.

It is also known to produce chlorine, sodium hydroxide solution and hydrogen by an electrolysis of sodium chloride solutions in membrane cells, in which an anode chamber and a cathode chamber are separated by an ion exchange membrane, which is permeable virtually only to the alkali ions. The latter are electrically neutralized at the cathode and react in the cathode chamber with water to form alkaline solution and hydrogen. On the other hand, halogen ions cannot migrate through the membrane and are released only in the anode chamber as halogen gas. Part of the OH ions formed in the cathode chamber migrate through the membrane into the anode chamber and in the latter react with the chlorine gas to form oxyacids of chlorine and/or salts thereof, depending on the pH value of the anolyte. These compounds are undesirable and can be destroyed only by an addition of acid. This disadvantage has been eliminated by the use of acid anolyte (D. Bergner, "Elektrolytische Chlorerzeugung nach dem Membran-Verfahren", Chemiker-Zeitung 101 (1977), pages 433 to 447). In the process disclosed in U.S. Pat. No. 3,948,737, the pH value of the anolyte should not be in excess of 4.5, and should preferably be between 2.5 and 4.0, although pH values of 1 or lower are permissible.

It is an object of the invention to provide for the production of chlorine dioxide and, if desired, chlorine, a process in which the use of alkali chlorate and hydrogen chloride as starting materials is avoided and which can be carried out to advantage in pulp mills which lack a satisfactory supply of raw materials.

SUMMARY OF THE INVENTION

In a process of producing chlorine dioxide and, if desired, chlorine, from hydrogen chloride and electrolytically produced alkali chlorate wherein the resulting residual solution is recycled to the electrolyte process for the production of new chlorate, said object is accomplished in that hydrogen chloride, in a quantity which is at least a major part of the equivalent of the chlorine dioxide product, is produced by producing chlorine gas by the electrolysis of alkali chloride in a membrane cell and burning the same with hydrogen, the hydrogen chloride so produced being reacted with the sodium chlorate which becomes available as a by-product of the electrolysis of alkali chloride, or the decomposition product of said sodium chlorate is fed to the cycle comprising the decomposition of chlorate and the electrolytic production of chlorate.

Electrolysis of alkali chloride:

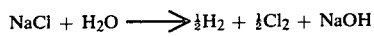

Electrolytic production of chlorate:

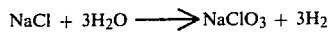

Combustion of chlorine:

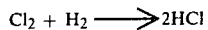

Production of chlorine dioxide:

-continued

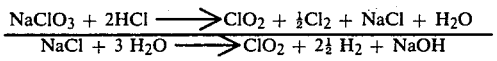
$$\frac{NaClO_3 + 2HCl \longrightarrow ClO_2 + \tfrac{1}{2}Cl_2 + NaCl + H_2O}{NaCl + 3H_2O \longrightarrow ClO_2 + 2\tfrac{1}{2}H_2 + NaOH}$$

This shows that the economy of the process depends only on the costs of electric power and common salt. Obviously, the first of the reactions mentioned above may be used to produce more chlorine than is stoichiometrically required according to the sum equation so that additional $Cl_2$ and NaOH are produced in the quantities required for bleaching.

BRIEF DESCRIPTION OF DRAWING

The process according to the invention will now be described more fully with reference to the accompanying drawing which is a flow diagram showing one embodiment for carrying out the process of the invention.

DESCRIPTION OF SPECIFIC EMBODIMENT

Common salt solution is initially required to start the production of alkali chlorate in an electrolytic cell 1. This common salt solution is fed from a salt dissolver 27 of a brine purifier 20 via conduit 24 to a membrane cell 2 for the electrolysis of alkali chloride and via conduit 18 to the electrolytic cell 1 for the production of alkali chlorate. Sodium chlorate produced in the electrolytic cell 1 is fed via conduit 3 to the chlorine dioxide reactor 4, in which sodium chlorate is decomposed in contact with hydrochloric acid fed via conduit 6. All hydrochloric acid required to produce chlorine dioxide may be produced by the electrolysis of alkali chloride in membrane cell 2 and the subsequent combustion of chlorine and hydrogen in reactor 5. The hydrogen required for this purpose becomes available in the chlorate-producing electrolytic cell 1 and in the membrane cell 2 and is supplied via conduits 7 and 8.

The stream 9 of hydrogen chloride which has been synthesized in the reactor 5 contains surplus hydrogen and flows through an absorber 10, from which hydrogen and nitrogen are released, and then enters the chlorine dioxide reactor 4 via conduit 6. The residual solution left after the reaction is recycled in known manner via conduit 11 to the chlorate-producing electrolytic cell 1. Diluent air is sucked through pipe 12 into the chlorine dioxide reactor 4. Mixed reaction gases consisting of $ClO_2$ and $Cl_2$ leave the chlorine dioxide reactor 4 via conduit 13. An aqueous solution of chlorine dioxide is discharged via conduit 15 from the absorber 14. The remaining mixture of chlorine gas and air is withdrawn via 16 and added to the stream 17 of chlorine withdrawn from the membrane cell 2 for the electrolysis of alkali chloride. Alternatively, the mixture of chlorine gas and air can be introduced into alkaline solution to form alkali hypochlorite.

The electrolysis in the membrane cell results in known manner in the formation of an alkaline solution, which is withdrawn as stream 25. Water is fed through pipe 26 to the cathode chamber.

According to a preferred further feature of the invention, at least a partial stream 19 of the anolyte 18 which leaves the membrane cell 2 and necessarily contains chlorate is strengthened with alkali chloride in the salt dissolver 27. When the impurities have been precipitated in the purifier 20, another partial stream 28 at an elevated temperature of, e.g., 70° to 90° C. is adjusted in the reactor 21 to a pH value below 1. The mixed chlorine and chlorine dioxide gases which have been formed by this decomposition in dependence on the pH value are recycled via conduits 23 and 16 to the combustion stage for the production of hydrogen chloride or are added to the reaction gases flowing from the $ClO_2$ reactor 4 to the absorber 14, in which $ClO_2$ is absorbed. Before being re-fed to the anode chamber, the alkali chloride solution is adjusted to a higher pH value in the range of 1 to 6, preferably 1 to 2.5. To promote the quantitative destruction of the oxyacids of chlorine and/or the salts of such acids, the second partial stream 28 is desirably adjusted to a pH value below 0.8 and is controlled at a low rate depending on the desired final pH value of the alkali chloride solution. To that end, the rate of the second partial current 28 does not exceed 20 percent and is preferably 8 to 15 percent of the rate at which anolyte is withdrawn.

According to a particularly preferred further feature of the process according to the invention, a partial stream of the chlorate-containing anolyte 19 leaving the membrane cell is contacted in the decomposing reactor 21 with hydrochloric acid withdrawn via conduit 22 from the hydrogen chloride synthesis stage 5/10. The resulting mixed chlorine dioxide and chlorine gases are added via conduit 23 to the mixed $ClO_2$ and $Cl_2$ gases withdrawn from the chlorate decomposer 4.

The invention thus provides a combined process comprising a decomposition of alkali chlorate and an electrolysis of alkali chloride. In said combined process there is a functional cooperation of elements of both component processes in that (a) hydrogen chloride produced from at least part of the chlorine obtained by the electrolysis of alkali chloride in a membrane cell is fed to the chlorine dioxide reactor;

(b) the chlorine-air mixture leaving the $ClO_2$ absorber is burnt with the hydrogen formed by the electrolysis in the membrane cell and in the electrolytic cell for the production of chlorate;

(c) the chlorine-chlorine dioxide mixture produced by the decomposition of alkali chlorate produced by the electrolysis in the membrane cell is added to the stream of chlorine dioxide withdrawn from the chlorine dioxide reactor.

The equipment used in the process according to the invention for the decomposition of chlorates comprises chlorine dioxide reactors or electrolytic equipment and agrees substantially with the equipment used for the Munich process (see German Pat. No. 831,542 and Ullmann, 3rd edition, vol. 5, page 553).

The membrane cell has the structural elements known per se. Suitable membrane materials comprise polyfluorohydrocarbons containing cation-exchanging groups, such as sulfonic acid groups ($SO_3H$), carboxylic acid groups (COOH) and phosphonic acid groups ($PO_3H_2$). Whereas graphite anodes may be used, it is particularly desirable to provide titanium, niobium or tantalum anodes coated with noble metal or with noble metal oxide, or so-called dimensionally stable anodes, which have an electrocatalytic activity owing to the presence of mixed oxides of noble metals and film-forming metals, particularly titanium.

Particularly preferred cathode materials are steel and nickel, particularly nickel in the form of the so-called double-skeleton cathodes.

The process according to the invention affords, inter alia, the following advantages:

In the process according to the invention, all or at least a major part of the hydrochloric acid required for the production of chlorine dioxide by the decomposition of sodium chlorate is produced in the process itself. Besides, the process is carried out with a surplus of hydrogen, which results in desirable, safe operating conditions because a large surplus of diluent air can be burnt so that the chlorine dioxide content in the chlorine dioxide reactor can be kept considerably below the explosion limit. Hydrochloric acid can be synthesized in the presence of a surplus of hydrogen so that an aftertreatment of the gases is not required and the undesired sodium hypochlorite is not formed. Whereas the chlorate formed during the electrolysis of alkali chloride in the membrane cell is not desired there, the resulting chlorate can be used to advantage for the production of chlorine dioxide by a decomposition of acid. In the process according to the invention, any surplus chlorine can be completely used for the synthesis of hydrogen chloride. For reasons of safety, equipment for the electrolysis of alkali chloride must be provided with an emergency absorber, which in case of an emergency can take up all chlorine product for a certain time with formation of hypochlorite. In the process according to the invention, the resulting hypochlorite may be fed to the chlorate-producing electrolytic cell operated at elevated temperatures, at which the hypochlorite is converted to sodium chlorate which can then be reacted to form the desired chlorine dioxide.

In order to more fully illustrate the nature of the invention and the manner of practicing the same, the following example is presented:

EXAMPLE

Bleached pulp is produced at a rate of 500 tons per day in a pulp mill. Thirteen tons of chlorine and eight tons of chlorine dioxide are required daily for bleaching and are produced by the process according to the invention. The chlorine dioxide reactor 4 and the membrane cell 2 are operated with an efficiency of 88 percent. If the chlorine dioxide reactor 4 is operated at an efficiency of 88 percent, 1.54 tons of hydrochloric acid are required per metric ton of chlorine dioxide for the decomposition of the sodium chlorate. 0.99 ton of hydrochloric acid can be produced from the effluent gases 16. The remaining 0.55 ton of hydrochloric acid must be produced from the chlorine stream 17. 0.1 ton of hydrogen becomes available in the electrolytic cell 1 for the production of chlorate. Because 0.116 ton of hydrogen is required, the additional hydrogen which is required is taken via conduit 8 from the membrane cell 2. It is apparent that 0.55 ton of hydrochloric acid, corresponding to 0.54 ton of chlorine, is required per ton of chlorine dioxide. For this reason, the membrane cell 2 is operated to produce chlorine at a net rate of 17.3 tons per day. 13 tons of chlorine per day are used for bleaching and 4.3 tons chlorine per day are burnt to produce hydrogen chloride used as raw material for the decomposition of sodium chloride in the reactor 4.

The membrane cell used for the electrolysis of alkali chloride in the process according to the invention is operated at an efficiency of 88 percent, which means that secondary reactions result in a current loss of 12 percent. Specifically, 7.5 percent of the current is consumed for secondary reactions by which sodium chlorate is formed. This corresponds to a production of 0.65 ton of sodium chlorate per day. The resulting sodium chlorate is decomposed in contact with one ton of hydrochloric acid to produce chlorine as well as 0.36 ton of chlorine dioxide per day. In that case, smaller equipment may be used because it is sufficient to produce chlorine dioxide at a rate which is smaller by 0.36 ton per day. On the other hand, the membrane cell 2 must be operated to produce chlorine at a net rate of 18.3 tons per day.

If all of the chlorate produced at a rate of 0.65 ton per day by the electrolysis of alkali chloride in the cell 2 is to be reacted in a highly acid medium to produce chlorine, hydrochloric acid will be required at a rate of 1.34 tons per day for the reaction itself and at an additional rate of 0.48 ton per day for the adjustment of the required pH value. In this operation, the equipment for producing chlorine dioxide is operated at the original capacity, but the net rate at which chlorine is produced by the electrolysis of alkali chloride in cell 2 must be increased by 0.47 ton per day to about 17.8 tons per day. In that case, chlorine is produced at a gross rate of about 19 tons of chlorine per day.

If the process according to the invention is carried out without using an additional chloride decomposer 21, a partial stream of the anolyte 18, at a rate corresponding to 0.65 ton of sodium chlorate per day, is fed to the cycle which includes the electrolytic cell 1 for the production of sodium chlorate. In that case, the equipment for producing chloride has the original size, but sodium chlorate must be produced in the electrolytic cell 1 only at a rate of 13.8 tons rather than 14.4 tons per day and the membrane cell for the electrolysis of alkali chloride is operated at an increased net rate of 18.6 tons of chlorine per day and the common salt which has been fed to the cycle which includes the chlorate-producing cell 1 together with the sodium chlorate from the membrane cell 2 is recycled via conduit 29 to the brine cycle of the membrane cell when the chlorate has been decomposed in the reactor 4.

What is claimed is:
1. A process for producing $ClO_2$ which comprises
   (A) feeding aqueous NaCl into an electrolyte membrane cell and therein electrolyzing the same to obtain $H_2$ $Cl_2$, NACH
   (B) reacting the $H_2$ and $Cl_2$ formed in step A to form HCl;
   (C) feeding HCl from step B into a chlorate reaction zone;
   (D) feeding $NaClO_3$ into said chlorate reaction zone, with $NaClO_3$ being obtained as a product of an electrolysis of NaCl;
   (E) reacting sodium chlorate with hydrochloric acid in said chlorate reaction zone to form chlorine dioxide chlorine and sodium chloride;
   (F) separating said $ClO_2$ and $Cl_2$ from NaCl and electrolyzing said NaCl in an electrolysis cell to obtain $NaClO_3$ and recycling the same to step D.

2. A process according to claim 1, wherein the mixed gases which become available as a result of the reaction of chlorate in step E are scrubbed and the resulting chlorine gas together with hydrogen, at least part of which comes from the membrane cell used in step A, is fed to the combustion stage of step B for producing hydrogen chloride.

3. A process according to claim 1 wherein the mixed gases which become available as a result of the reaction of chlorate in step E are scrubbed and the resulting chlorine gas is introduced into alkaline solution to form alkali hypochlorite.

4. A process according to claim 1, wherein at least a partial stream of the anolyte withdrawn from the membrane cell employed in step A is strenghtened with alkali halide, precipitates are removed and the so-strengthened anolyte is then adjusted to a pH value below 1 at elevated temperature in a decomposer thereby decomposing chlorate in said anolyte to form chlorine and chlorine dioxide gases, the resulting chlorine gas is fed to the combustion stage of step B for the production of hydrogen chloride, and the alkali halide solution is adjusted to a higher pH value in range of 1 to 6 before it is recycled to the anode chamber of the membrane cell.

5. A process according to claim 4 wherein said alkali halide solution is adjusted to pH 1 to 2.5.

6. A process according to claim 4 wherein a partial stream amounting to at least 20 percent of the anolyte withdrawn from the membrane cell is formed and is adjusted to a pH value below 1.0 and is subsequently re-united with the main stream of said anolyte to form a re-united stream having a desired pH value in the range of 1.0 to 6.0.

7. A process according to claim 6 wherein said anolyte is adjusted to pH below 0.8.

8. A process according to claim 6 wherein said partial stream amounts to 8 to 15 percent of the anolyte withdrawn from said membrane cell.

9. A process according to claim 1 wherein hydrochloric acid is added to a partial stream of the anolyte withdrawn from the membrane cell and the resulting mixed gases are united with the mixed gases which have become available in the chlorate decomposer of steps D and E.

10. A process according to claim 4 wherein anolyte is withdrawn from the membrane cell is fed to the decomposition of chlorate in the decomposer.

11. A process according to claim 4, wherein the $ClO_2$ decomposition product of said sodium chlorate is mixed with the chlorine dioxide obtained from step E.

12. A process according to claim 1, wherein all of the HCl used for the $NaClO_3$ reaction comes from reaction of hydrogen and chlorine which is given off by the membrane cell.

13. A process according to claim 1, wherein at least a major part of hydrogen chloride in a quantity which is at least a major part of the equivalent of the chlorine dioxide is produced by burning of chlorine gas with hydrogen, said chlorine gas being taken from the electrolysis of alkali metal chloride in a membrane cell.

* * * * *

REEXAMINATION CERTIFICATE (232nd)
United States Patent [19]
Lohrberg et al.

[11] B1 4,294,815

[45] Certificate Issued  Aug. 14, 1984

[54] PROCESS OF PRODUCING CHLORINE DIOXIDE AND, IF DESIRED, CHLORINE

[75] Inventors: Karl Lohrberg, Heusenstamm; Siegfried Bielz, Frankfurt am Main; Paul Janisch, Steinau, all of Fed. Rep. of Germany

[73] Assignee: Metallgesellschaft Aktiengesellschaft, Frankfurt, Fed. Rep. of Germany

Reexamination Request:
No. 90/000,247, Aug. 26, 1982

Reexamination Certificate for:
Patent No.: 4,294,815
Issued: Oct. 13, 1981
Appl. No.: 93,708
Filed: Nov. 13, 1979

[30] Foreign Application Priority Data
Nov. 14, 1978 [DE]  Fed. Rep. of Germany ....... 2849250

[51] Int. Cl.$^3$ ............................................. C01B 11/02
[52] U.S. Cl. ...................... 423/478; 204/95; 204/98; 204/128
[58] Field of Search ................. 423/478, 477; 204/95, 204/98, 128

[56] References Cited
U.S. PATENT DOCUMENTS

| | | | |
|---|---|---|---|
| 2,967,807 | 1/1961 | Osborne | 204/98 |
| 3,502,443 | 3/1970 | Westerlund | 23/282 |
| 3,516,790 | 6/1970 | Westerlund | 23/152 |
| 3,755,068 | 8/1973 | Rapson | 162/30 |
| 3,816,077 | 6/1974 | Fuller | 23/260 |
| 3,897,320 | 7/1975 | Cook | 204/98 |
| 4,055,476 | 10/1977 | Benezra et al. | 204/98 |
| 4,155,819 | 5/1979 | Carlin | 204/98 |
| 4,169,773 | 10/1979 | Lai et al. | 204/98 |
| 4,247,375 | 1/1981 | Lohrberg | 204/98 |

FOREIGN PATENT DOCUMENTS 571458  3/1959  Canada.
871614  5/1971  Canada.
956784  10/1974  Canada.

*Primary Examiner*—Earl C. Thomas

[57] ABSTRACT

A process for the production of chlorine dioxide by membrane electrolysis of aqueous sodium chloride, reaction of hydrogen and chlorine so-formed to form hydrogen chloride and reaction of the so-formed hydrogen chloride with the sodium chlorate also formed by the electrolysis to form chlorine dioxide is disclosed. Also disclosed is the production of chlorine by such a process.

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended:

Claims 2–13, dependent on amended claims, are determined to be patentable.

New claims 14–23 are added and determined to be patentable.

1. A process for producing $ClO_2$ which comprises
   (A) feeding aqueous NaCl into an electrolyte membrane cell and therein electrolyzing the same to obtain $H_2$, $Cl_2$, [NACH] *NaOH and an anolyte containing $NaClO_3$*;
   (B) reacting the $H_2$ and $Cl_2$ [formed] *obtained* in step A to form HCl;
   (C) feeding HCl from step B into a *first* chlorate reaction zone;
   (D) feeding $NaClO_3$ into said *first* chlorate reaction zone, with $NaClO_3$ being obtained as a product of an electrolysis of NaCl;
   (E) reacting sodium chlorate with hydrochloric acid *in aqueous solution* in said *first* chlorate reaction zone to form chlorine dioxide, chlorine and sodium chloride;
   (F) separating said $ClO_2$ and $Cl_2$ from NaCl and electrolyzing said NaCl in an electrolysis cell to obtain $NaClO_3$ and recycling the same to step D; *and*
   *(G) employing said $NaClO_3$ in said anolyte to generate $ClO_2$ by contacting the $NaClO_3$ from said anolyte with either HCl either*
   *(1) in said first chlorate reaction zone; or*
   *(2) in a second chlorate zone to which HCl is fed.*

*14. A process according to claim 1, wherein a portion of said NaCl obtained from step (E) is recycled to said membrane cell and said $NaClO_3$ in said anolyte is recycled to step (E).*

*15. A process according to claim 1, wherein a portion of said $NaClO_3$ fed to said first chlorate reaction zone is $NaClO_3$ obtained from said anolyte.*

*16. A process according to claim 1, wherein a portion of said $NaClO_3$ of said anolyte is reacted with HCl in aqueous solution in a second chlorate reaction zone to form chlorine dioxide and chlorine.*

*17. A process according to claim 16, wherein a portion of said chlorine dioxide and chlorine obtained from said second chlorate reaction zone is combined with chlorine dioxide and chlorine obtained from said first chlorate reaction zone.*

*18. A process according to claim 16, wherein a portion of the HCl used in said second chlorate reaction zone is obtained from burning $H_2$ and $Cl_2$ produced by said membrane cell.*

*19. A process according to claim 1, wherein a portion of said $NaClO_3$ fed to said first chlorate reaction zone is $NaClO_3$ produced in an electrolysis cell other than said membrane cell.*

*20. A process according to claim 19, wherein a portion of said anolyte is mixed with $NaClO_3$ produced in said electrolysis cell other than said membrane and the resultant mixture is fed to said first chlorate reaction zone.*

*21. A process according to claim 19, wherein NaCl produced in said first chlorate reaction zone is electrolyzed in said electrolysis cell other than said membrane cell.*

*22. A process according to claim 21, wherein a portion of said NaCl produced in said first chlorate reaction zone is fed to said membrane cell and therein electrolyzed.*

*23. In a process in which NaCl, $Cl_2$ and $ClO_2$ are generated in a $ClO_2$ generator from $NaClO_3$ which has been prepared by electrolysis of aqueous NaCl, and HCl, $Cl_2$ and $ClO_2$ are separated from NaCl, the HCl being obtained from electrolytically produced $H_2$ and $Cl_2$, the improvement which comprises utilizing a membrane cell to produce $H_2$ and $Cl_2$ from aqueous NaCl fed to said membrane cell and passing $NaClO_3$ additionally produced in the membrane cell to the $ClO_2$ generator and subjecting NaCl produced in said $ClO_2$ generator to electrolysis to obtain $NaClO_3$ and recycling said $NaClO_3$ to said $ClO_2$ generator.*

* * * * *